(12) United States Patent
Chandler, Jr. et al.

(10) Patent No.: US 6,439,523 B1
(45) Date of Patent: Aug. 27, 2002

(54) UNIVERSAL MOUNTING SYSTEM FOR A FIBER OPTIC MANAGEMENT CENTER

(75) Inventors: Philip B. Chandler, Jr., Frankfort; Michael T. Vavrik, Oak Forest, both of IL (US)

(73) Assignee: Panduit Corp., Tinley Park, IL (US)

( * ) Notice: Subject to any disclaimer, the term of this patent is extended or adjusted under 35 U.S.C. 154(b) by 0 days.

(21) Appl. No.: 09/587,065

(22) Filed: Jun. 2, 2000

(51) Int. Cl.[7] .............................. A47F 5/00; A47H 1/00
(52) U.S. Cl. ...................... 248/300; 248/675; 211/189
(58) Field of Search ................. 248/220.21, 220.41, 248/220.43, 221.12, 222.41, 223.21, 201, 675, 674, 300; 211/188, 26, 26.1, 189, 190; 361/829; 312/286, 140, 223.2; 403/354

(56) References Cited

U.S. PATENT DOCUMENTS

| 3,731,956 A | * | 5/1973 | Hanley | 287/20.926 |
| 3,986,318 A | * | 10/1976 | McConnell | 211/192 |
| 5,163,568 A | * | 11/1992 | Laurendeau et al. | 211/187 |
| 5,683,001 A | * | 11/1997 | Masuda | 211/26 |
| 5,709,359 A | * | 1/1998 | Riley | 248/201 |
| 6,095,345 A | * | 8/2000 | Gibbons | 211/26 |
| 6,123,203 A | * | 9/2000 | Gibbons | 211/26 |
| 6,195,493 B1 | * | 2/2001 | Bridges | 385/134 |

* cited by examiner

Primary Examiner—Anita King
Assistant Examiner—Gwendolyn Baxter
(74) Attorney, Agent, or Firm—Robert A. McCann; Jay A. Saltzman; Christopher S. Clancy

(57) ABSTRACT

A system for attaching an enclosure to a fiber optic rack is disclosed. The system includes at least one bracket having a mounting aperture pattern which at least partially matches the rack aperture patterns presently in use.

8 Claims, 4 Drawing Sheets

US 6,439,523 B1

UNIVERSAL MOUNTING SYSTEM FOR A FIBER OPTIC MANAGEMENT CENTER

RELATED APPLICATIONS

This disclosure is related to the following U.S. patent applications filed on the same date as this application, each of which is owned by the assignee of this application, and the entirety of each of which is hereby incorporated herein by reference:

U.S. Patent Application entitled "Improved Cable Management System," naming Jack E. Caveney and Dale A. Block as inventors.

U.S. Patent Application entitled "Slack Cable Management System," naming Jack E. Caveney as an inventor.

U.S. Patent Application entitled "Improved Enclosure for Use in Fiber Optic Management Systems," naming Michael T. Vavrik and Philip B. Chandler, Jr. as inventors.

U.S. Patent Application entitled "Modular Latch and Guide Rail Arrangement for Use in Fiber Optic Cable Management Systems," naming Samuel M. Marrs, Robert R. Brown, and John J. Bulanda as inventors.

U.S. Patent Application entitled "Vertical Cable Management System," naming Samuel M. Marrs, Michael T. Vavrik, and Jeff Paliga as inventors.

BACKGROUND OF THE INVENTION

The present invention relates generally to a fiber optic communication center and more particularly to a universal system for mounting fiber optic interconnection enclosures to a fiber optic rack.

A fiber optic communication center represents a "node" where fiber optic networks are connected. Typically, individual fiber optic cables are interconnected within an enclosure, such as splice, connector and modular enclosure. The communication center is defined by a series of enclosures mounted on a rack, thereby facilitating organization of the various fiber optic networks.

Unfortunately, the industry has multiple standards for the enclosure-carrying racks. For example, there are presently two standards for the mounting hole pattern on the vertically extending rack. One was specified by the Western Electric Company ("WECO"); the other is specified by the Electronics Industries Alliance/Telecommunications Industry Association ("EIA"). More particularly, the mounting apertures of the WECO rack are equally spaced at 1 inch increments (hereinafter referred to as the "WECO Pattern"). In the EIA rack, the mounting apertures are alternately spaced at 1.25 inches and 0.5 inch (hereinafter referred to as the "EIA Pattern").

Additionally the horizontal spacing, or gap, between the vertical racks varies between two unofficial standards. In a "public network," such as sold by WECO, the racks are separated by 23 inches, providing a useable gap of 21.5 inches. In a "premises network," such as sold by EIA, the separation is 19 inches with a useable gap of 17.5 inches.

SUMMARY OF THE INVENTION

In a principal aspect, the present invention is a universal mounting system for use ith both the WECO and EIA racks. The present invention includes a bracket having a series of mounting apertures. Regardless of the orientation of the bracket with respect to the rack, the mounting apertures at least partially match the WECO Pattern and EIA Pattern, thereby facilitating attachment. As used herein, the term "at least partially match" and obvious modifications thereof mean alignment of at least two non-adjacent mounting apertures on the bracket with two mounting apertures of the WECO Pattern and EIA Pattern.

It is thus an object of the present invention to provide an improved mounting system for attaching an enclosure to a fiber optic rack. Another object is an enclosure-mounting system for use, without alteration, with WECO and EIA racks. Still another object is a universal enclosure-mounting system for use with WECO and EIA racks in either network configuration, i.e., public or premises. Yet another object of the present invention is a universal enclosure-mounting system wherein the enclosure is supported by a rack bracket to facilitate the attachment process. It is also an object to provide a universal enclosure-mounting system wherein the spacing between adjacent enclosures on the rack is minimized.

These and other features, objects and advantages of the present invention are set forth or apparent in the following detailed description.

BRIEF DESCRIPTION OF THE DRAWING

Various preferred embodiments of the present invention are described herein with reference to the drawing herein.

DETAILED DESCRIPTION OF PREFERRED EMBODIMENTS

Figure 1:
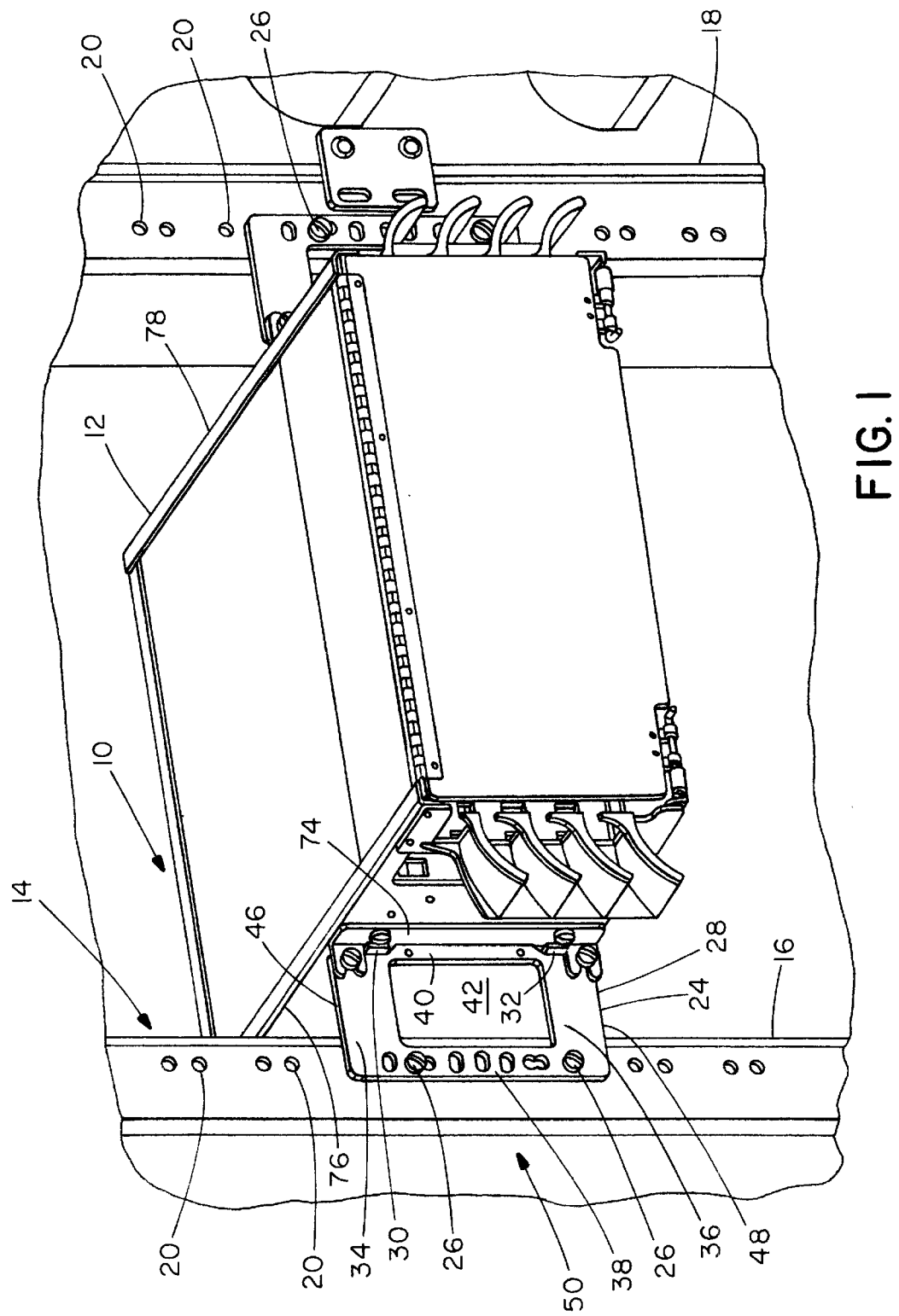
FIG. 1 is a partial perspective view of a fiber optic communication center, illustrating a preferred embodiment of the present invention in a rack having the EIA Pattern.
Figure 2:
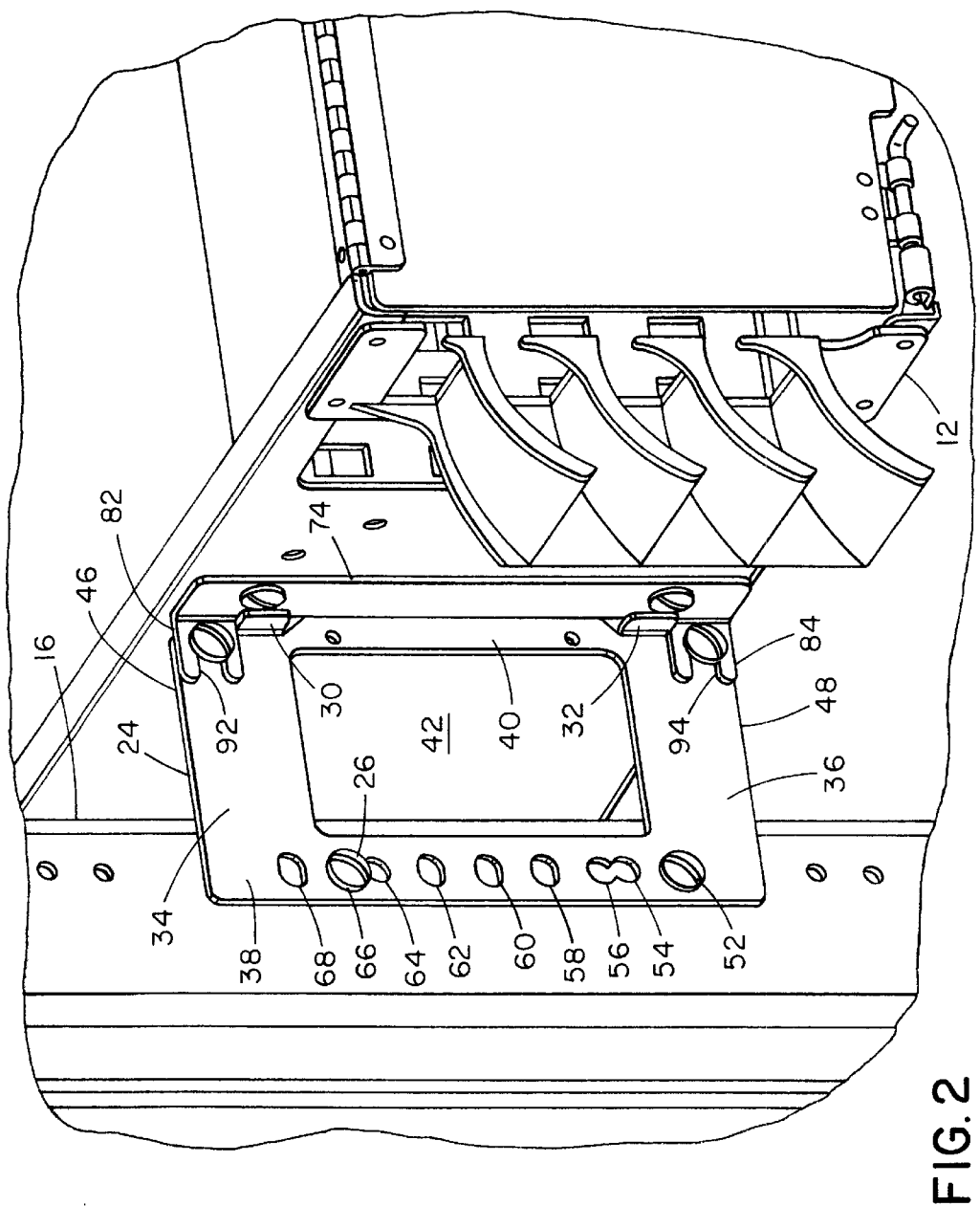
FIG. 2 is an enlarged partial perspective view.
Figure 3:
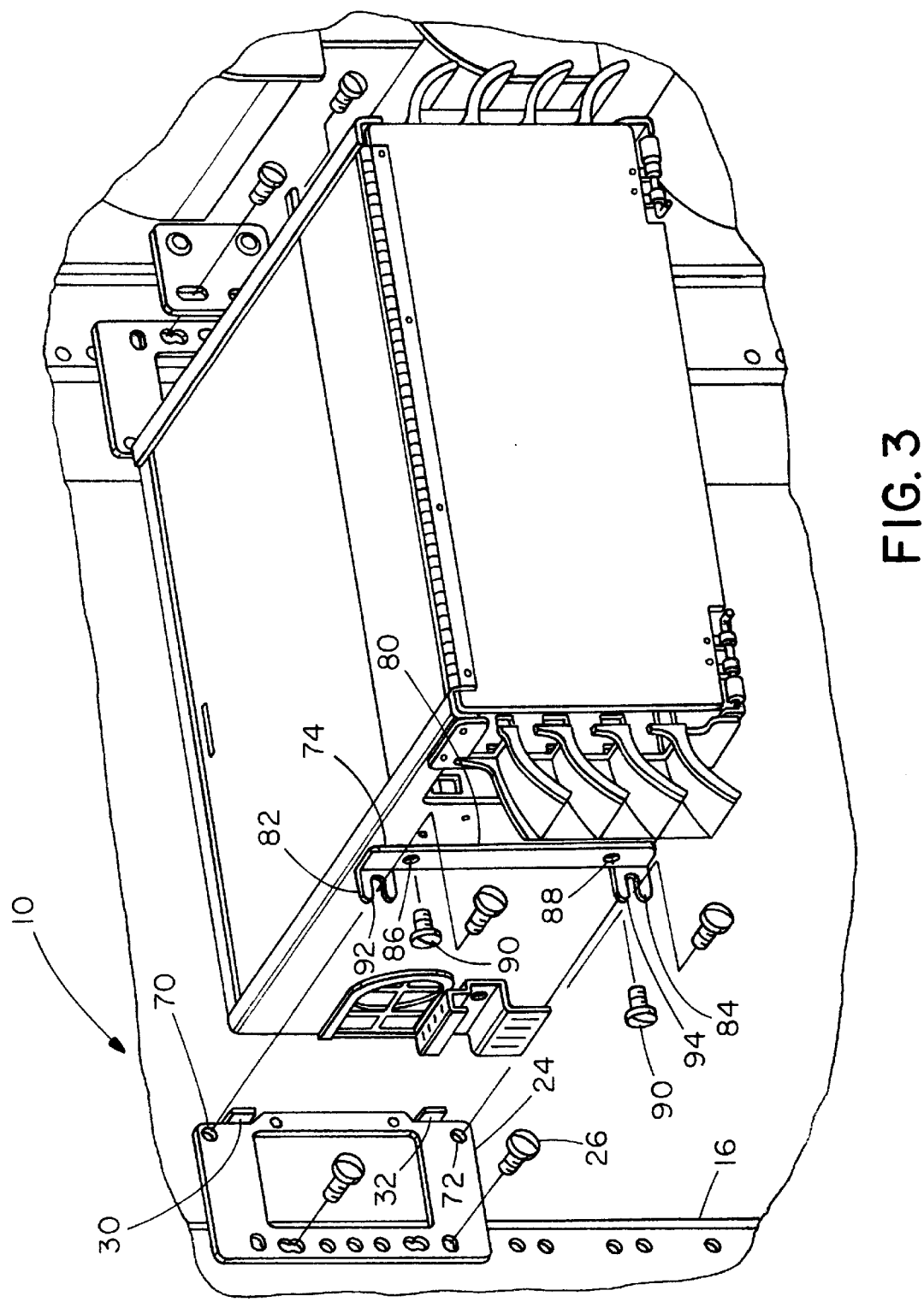
FIG. 3 is an exploded perspective view of the preferred embodiment shown in FIG. 1.
Figure 4:
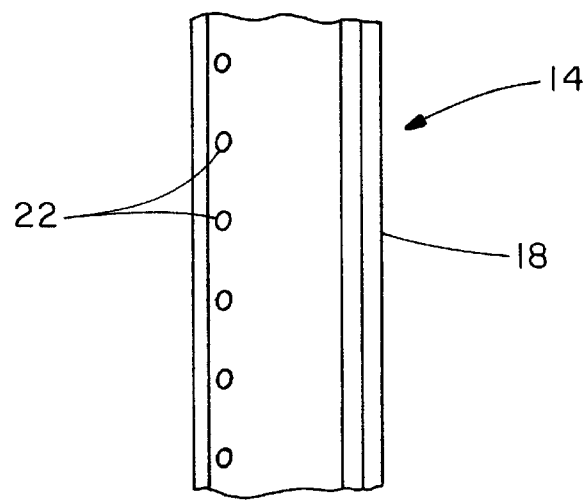
FIG. 4 is a front view of a rack with the WECO Pattern.

A first preferred embodiment of the present invention is shown in FIGS. 1–3 as a system, generally designated 10, for attaching fiber optic enclosure 12 to a rack, generally designated 14. As is well known in the art, the rack 14 includes left and right vertically secured frames 16, 18. The rack 14, as shown in FIGS. 1–3, is an EIA rack, having the EIA Pattern of holes 20. As shown, the holes 20 are alternately spaced at 1.25 inches and 0.5 inch, center-to-center. The system 10 further accommodates the WECO Pattern of holes 22, as shown in FIG. 4, where the spacing is equal and on 1 inch centers. The holes 20, 22 are threaded to receive a No. 12 screw with 24 threads per inch.

The system 10 includes a pair of substantially identical rack brackets 24, secured in horizontal alignment to the left and right frames 16, 18 by screws 26. The first and second, or left and right, rack brackets 24 are secured on the frames 16, 18 in a reversed orientation, i.e., the first bracket 24 is rotated 180° with respect to the second.

The bracket 24 includes a substantially planar, substantially rectangular rack-mounting plate 28 and a pair of support tabs 30, 32, respectively. In this preferred embodiment, the width of the plate 28 is about 3 inches. The plate 28 has a first section 34, second section 36, first-side or rack-side section 38, and second-side or enclosure-side section 40, defining a central, substantially rectangular opening 42. This opening 42 provides fiber optic cable access to the rear of the system 10.

The first and second support tabs 30, 32 extend from an outer edge 44 of the enclosure-side section 40, substantially perpendicular to the rack-mounting plate 28. As shown, the support tabs 30, 32 are equally displaced from the outer edges 46, 48 of the first and second sections 34, 36, respectively.

The rack-side section 38 defines a series, generally designated 50, of rack apertures 52, 54, 56, 58, 60, 62, 64, 66, 68. The central aperture 60 defines the center of the series 50, and the apertures 62, 64, 66, 68 are displaced therefrom at center-to-center intervals of 0.5, 1.125, 1.375 and 2 inches. The other apertures 52, 54, 56, 58 are similarly positioned from the center aperture 60. The apertures 54, 56 and 64, 66 are hourglass-shaped openings with the neck area small enough that the standard No. 12-24 screw will not pass through. This provides better positioning and support for the enclosure than slotted holes would provide. All apertures 52, 54, 56, 58, 60, 62, 64, 66, 68 are generally elliptical, providing sufficient "play" to plumb the bracket 24 on the rack 14.

The series 50 allows use of the bracket 24, in both orientations, with the WECO Pattern and EIA Pattern. That is, the series 50 results in at least partial matching of non-adjacent rack apertures 52, 54, 56, 58, 60, 62, 64, 66, 68 with at least two apertures of the WECO Pattern and EIA Pattern in both the first and second, or left and right, orientations of the bracket 24 with respect to the rack 14. Use of non-adjacent apertures within the series 50 enhances the structural integrity of the system 10. Additionally, the series 50 provides the option of avoiding use of both hourglass-shaped openings, as defined by the apertures 54, 56 and 64, 66, in any given application. Loosening due to the vibration is thereby substantially avoided.

The enclosure-side section 40 of the rack bracket 24 defines first and second enclosure-mounting apertures 70, 72. The apertures 70, 72, also threaded to receive a No. 12 screw, have a predetermined opposed relationship, i.e., the apertures 70, 72 are at opposite ends of the enclosure-side section 40, with a center-to-center separation of 4 inches. The support tabs 30, 32 are inwardly displaced from the enclosure-mounting apertures 70, 72.

The system 10 further includes a pair of substantially identical enclosure brackets 74. The enclosure brackets 74 are secured to opposite sides 76, 78 of the enclosure 12, in first and second, or left and right, reversed enclosure orientations, similar to the rack brackets 24.

Each of the enclosure brackets 74 includes a substantially planar enclosure attaching plate 80 and first and second flanges 82, 84, extending substantially perpendicular therefrom. In this preferred embodiment, the width of the plate 80 is about 0.5 inch. The plate 80 defines two enclosure-attaching apertures 86, 88, such that the enclosure brackets are affixed by screws 90.

The first and second flanges 82, 84 are slotted to define third and fourth enclosure-mounting apertures 92, 94, respectively. The apertures 92, 94 have the same predetermined opposed relationship as the first and second enclosure-mounting apertures 70, 72 of the rack bracket 24, further facilitating attachment of the enclosure 12 to the rack 14.

Additionally, the first and second support tabs 30, 32 engage the first and second flanges 82, 84 as the enclosure 12 is manually maneuvered onto the rack 14. This engagement guides the third and fourth enclosure-mounting apertures 92, 94 into alignment with the first and second enclosure-mounting apertures 70, 72. The tabs 30, 32 interpose the flanges 82, 84, thereby supporting the enclosure 12 during attachment to the rack 14.

Figure 5:
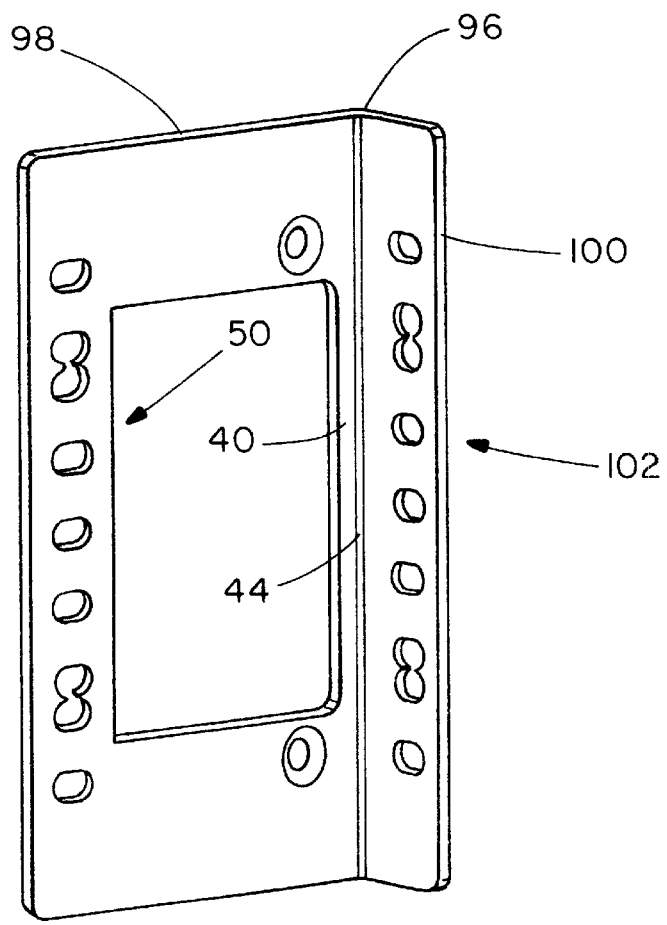
FIG. 5 is an enlarged perspective view of a second preferred embodiment of the present invention.

A second preferred embodiment of the present invention is shown in FIG. 5 as a single universal bracket 96 for direct attachment to both the enclosure 12 and rack 14. The bracket 96 is substantially L-shaped, having a plate portion 98 and a flange portion 100. The plate portion 98 is substantially identical to the rack-mounting plate 28 of the first preferred embodiment, described above, including the aperture series 50. The flange portion 100 is substantially planar and extends substantially perpendicular from the outer edge 44 of the enclosure-side section 40 thereof.

In this preferred embodiment, the flange portion 100 defines an aperture series, generally designated 102. The series 102 is substantially identical to, and horizontally aligned with, the series 50 of the plate portion 98.

As such, the bracket 96 can be mounted to the left and right frames 16, 18 of the rack 14, regardless of hole pattern. Furthermore, the bracket 96 can be used with both the 19 inch and 23 inch frame spacing. With 19 inch spacing, the flange portion 100 is affixed to the frames 16, 18; with 23 inch spacing, the plate portion 98 is affixed to the frames 16, 18.

Both embodiments are designed for use with enclosures 12 having a height of about 5.25 inches. Given the WECO and EIA Patterns, the enclosures 12 can be mounted on the rack 14 with virtually no interposing vertical spacing or gap. As such, the number of enclosures 12 per rack 14 is maximized.

Preferred embodiments of the present invention have been described herein. It is to be understood that modifications and changes can be made without departing from the true scope and spirit of the present invention, as defined by the following claims which are to be interpreted in view of the foregoing.

We claim:

1. A system for attaching an enclosure to a rack, having a WECO Pattern or an EIA Pattern, comprising, in combination:

first and second rack brackets secured to the rack in a first rack orientation and second rack orientation, respectively, said first rack orientation being reversed from said second rack orientation;

each of said first and second rack brackets including a rack-mounting plate, having a rack-side section and an enclosure-side section, and first and second support tabs extending from said enclosure-side section substantially perpendicular to said rack-mounting plate;

said rack-side section defining a series of rack apertures at least partially matching the WECO Pattern and the EIA Pattern in said first rack orientation and said second rack orientation;

said enclosure-side section defining first and second enclosure-mounting apertures having a predetermined opposed relationship; and first and second enclosure brackets secured to the enclosure in a first enclosure orientation and a second enclosure orientation, said first enclosure orientation being reversed from send second enclosure orientation;

each of said first and second enclosure brackets including an enclosure-mounting plate and first and second flanges extending substantially perpendicular from said enclosure-mounting plate;

said first and second flanges defining third and fourth enclosure-mounting apertures having said predetermined opposed relationship;

said first and second support tabs engaging said first and second flanges to guide said third and fourth enclosure-mounting apertures into alignment with said first and second enclosure-mounting apertures and support the enclosure with respect to the rack, thereby facilitating attachment of the enclosure to the rack.

2. A system as claimed in claim 1 wherein said first and second support tabs interposed said first and second flanges.

3. A system as claimed in claim 2 wherein said first and second flanges are slotted to provide said third and fourth enclosure-mounting apertures.

4. A bracket assembly for attaching an enclosure to a rack, having a WECO Pattern or an EIA Pattern, comprising, in combination:

a rack bracket securable to the rack in first and second rack orientations, said rack bracket including a rack-mounting plate, having a rack-side section and an enclosure-side section, and first and second support tabs extending from said enclosure-side section substantially perpendicular to said rack-mounting plate;

said rack-side section defining a series of rack apertures at least partially matching the WECO Pattern and the EIA Pattern in said first rack orientation and said second rack orientation;

said enclosure-side section defining first and second enclosure-mounting apertures having a predetermined opposed relationship; and an enclosure bracket securable to the enclosure in first and second enclosure orientations, said enclosure bracket including an enclosure-mounting plate and first and second flanges extending substantially perpendicular from said enclosure-mounting plate;

said first and second flanges defining third and fourth enclosure-mounting apertures having said predetermined opposed relationship;

said first and second support tabs engaging said first and second flanges to guide said third and fourth enclosure-mounting apertures into alignment with said first and second enclosure-mounting apertures and support the enclosure with respect to the rack, thereby facilitating attachment of the enclosure to the rack.

5. A bracket assembly as claimed in claim 4 wherein said first and second support tabs interposed said first and second flanges.

6. A system as claimed in claim 5 wherein said first and second flanges are slotted to provide said third and fourth enclosure-mounting apertures.

7. A bracket for attaching an enclosure to a rack, having a WECO Pattern or an EIA Pattern, said bracket having first and second mounting orientations, comprising:

a plate portion including a first-side section and a second-side section, said first-side section defining a plate series of apertures at least partially matching the WECO Pattern and the EIA Pattern in said first orientation and said second orientation.

8. A bracket for attaching an enclosure to a rack, having a WECO Pattern or an EIA Pattern, said bracket having first and second mounting orientations, comprising, in combination:

a plate portion including a first-side section and a second-side section, said first-side section defining a plate series of apertures at least partially matching the WECO Pattern and the EIA Pattern in said first orientation and said second orientation; and a flange portion extending substantially perpendicular from said second-side section, said flange portion defining a flange series of apertures at least partially matching the WECO Pattern and the EIA Pattern in said first orientation and said second orientation, said flange series substantially aligning with said plate series.

* * * * *